Feb. 16, 1965  H. KNAPPE  3,169,631
CONVEYOR
Filed Aug. 16, 1961  3 Sheets-Sheet 1
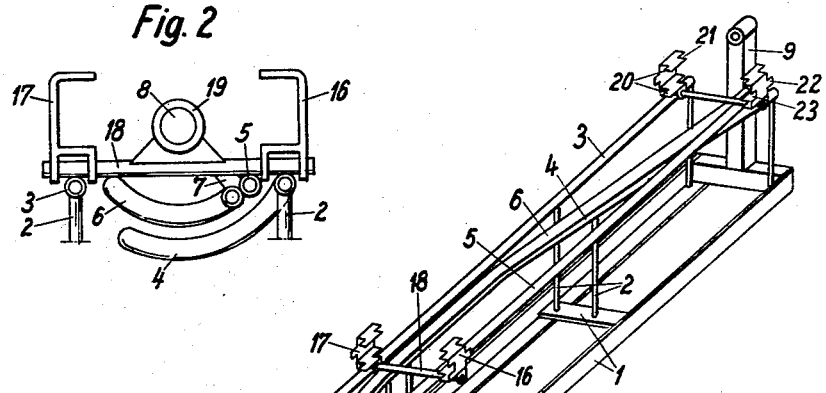
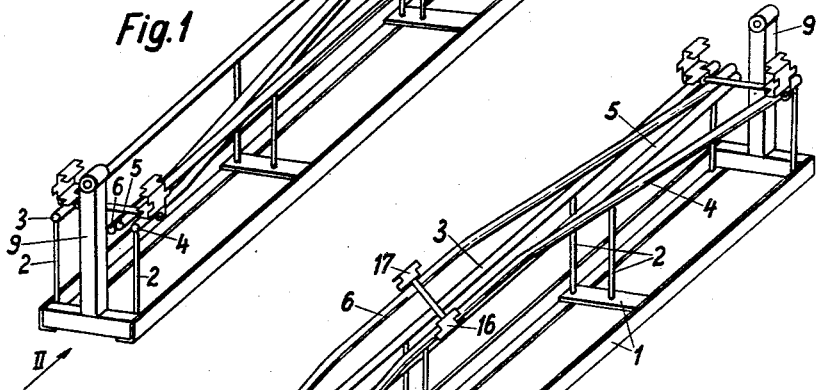
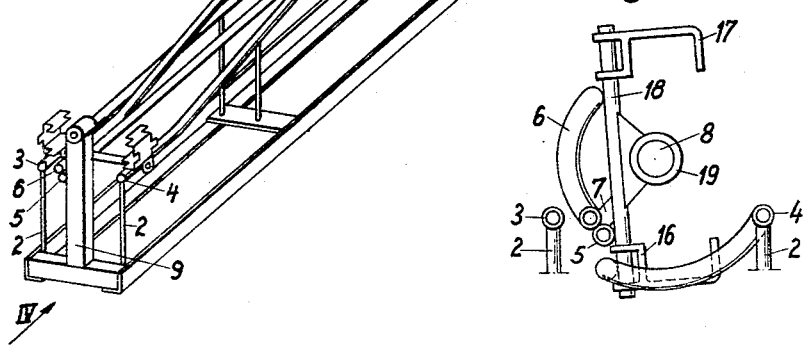
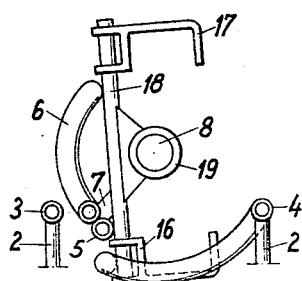

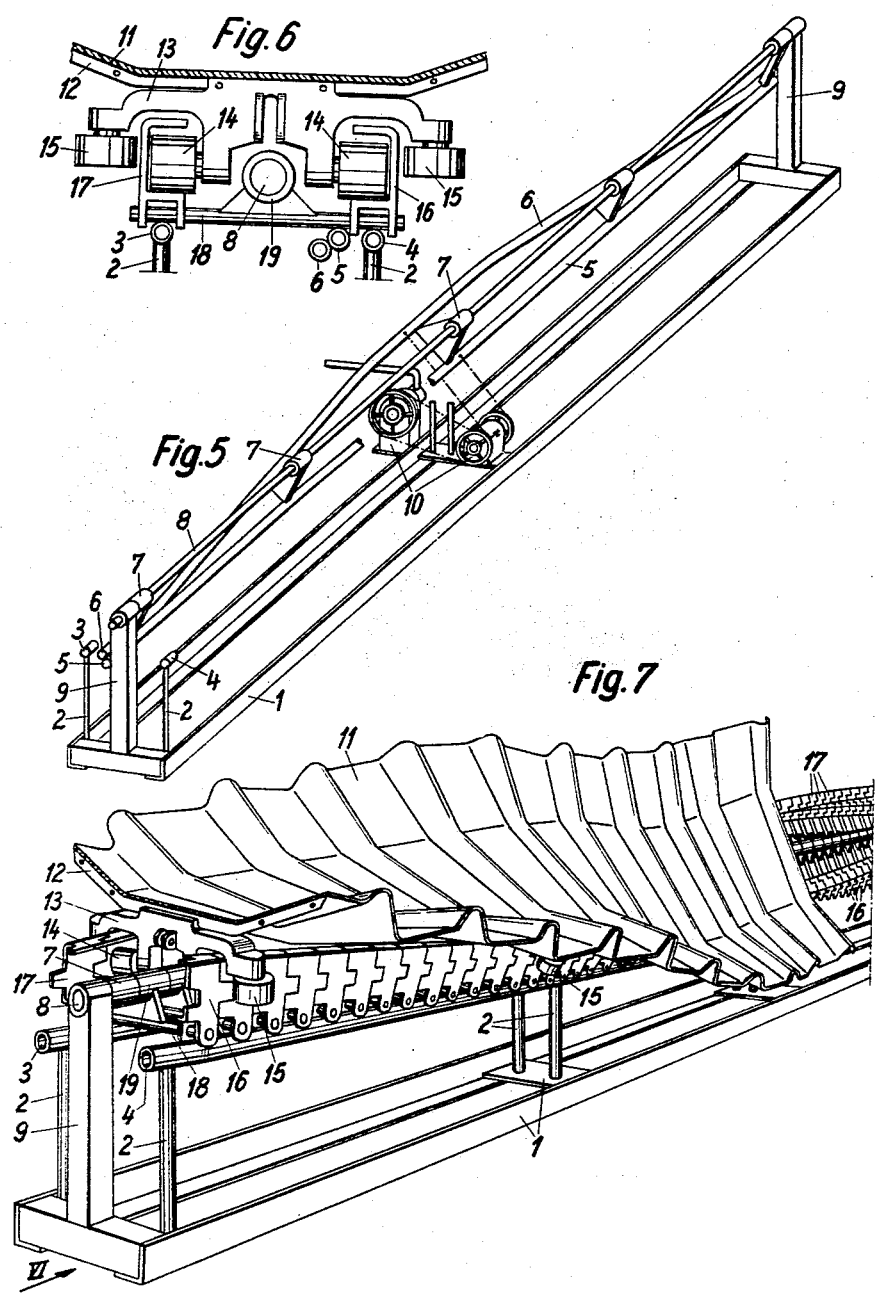

United States Patent Office 3,169,631
Patented Feb. 16, 1965

3,169,631
CONVEYOR
Heinrich Knappe, Bad Oeynhausen-Eidinghausen, Germany, assignor to Friedrich Stubbe, Vlotho an der Weser, Germany
Filed Aug. 16, 1961, Ser. No. 131,752
Claims priority, application Germany, Aug. 27, 1960, St 16,846
5 Claims. (Cl. 198—187)

The present invention relates to a conveyor and, more specifically, to a conveyor in which that part thereof which receives the material to be conveyed is equipped with rollers and is guided by a rail. This type of conveyors comprises for instance belt conveyors, in which the conveyor belt, for instance a rubber belt or a jointed steel band, is equipped with rollers or wheels moving on rails and guided thereby.

With other conveyors of the type involved, the movable part receiving the material to be conveyed comprises a plurality of containers which are interconnected and supported by rollers guided on rails.

Furthermore, conveyors have been developed in which the movable part receiving the material to be conveyed consists of a train of interconnected carriages. Conveyors of the type involved, of which some have been mentioned above as examples, have been equipped with one and also with a plurality of parallel rails of I-profile U-profile, or other profiles. Such rails may be arranged in the supporting frame of the conveyor.

Conveyors of the type involved are known in which the movable part receiving the material to be conveyed is endless as it is ordinarily the case with a conveyor belt of belt conveyors. With these conveyors, the movable part, for instance a conveyor belt, for receiving the material to be conveyed is guided either along a closed circular path or, in most instances, has its taut belt section guided from one station to another station while the slack section is returned below or alongside the taut section. However, also conveyors are known in which the movable part receiving the material to be conveyed, for instance a train of carriages, is not endless and is not moved always in one and the same direction but has a certain length only and carries out a shuttle traffic between two stations.

More particularly, the present invention concerns such conveyors of the above mentioned type, in which the movable part receiving the material to be conveyed is in longitudinal direction of the conveyor turnable or distortable along a helical line. This turnability or tiltability makes it possible to lift the respective surface carrying the material on one side and/or to lower it on the other side so that the material to be conveyed can be discharged laterally from the conveyor.

For instance belt conveyors have been known in which metal rails are at a certain portion of the conveyor, which portion serves as discharge station, so shaped that the conveyor belt when passing through said station will be turned or distorted helically thereby laterally discharging the material to be conveyed. This design of the rails has the drawback that the discharge of the material can be effected at one certain portion of the conveyor only. In other words, it is for instance not possible by means of such a conveyor to charge at random a plurality of bins or bunkers by moving the conveyor above said bins or bunkers and alternately to discharge the material to be conveyed at the end of the conveyor overhead into the last bin or bunker or laterally into any one of the preceding bins or bunkers while at the respective station during the required time the shape of the rail will be changed so that that part which carries the material to be conveyed, for instance a conveyor belt, will be helically distorted.

The just mentioned requirement is met by known belt conveyors equipped with a central rail of flexible or elastic material so that the rail may at any desired portion of the belt conveyor be turned about its longitudinal axis whereby the conveyor belt may be distorted helically. These known conveyors, however, have the drawback that on the said single central rail only such belt conveyors can be guided which have a limited width, weight and carrying capacity, because the flexible and elastic rail is able to absorb pressure forces and torques only to a limited extent.

It is, therefore, an object of the present invention to provide a conveyor which, while avoiding the above mentioned drawbacks of the heretofore known conveyors, will make it possible to helically distort the movable part for conveying the material to be conveyed at any desired portion of the conveyor without thereby limiting the width, the filling cross section, the weight of the material to be conveyed, and the carrying capacity of the rails.

It is another object of this invention to provide a conveyor as set forth in the preceding paragraph, which makes it possible to employ one guiding rail and also a plurality of parallel guiding rails of the respective required material, especially of iron.

It is still another object of this invention to provide a tilting discharging station for lateral discharge of the conveyor of the above mentioned type, which can easily, quickly and absolutely safely be adjusted for discharge and return from its discharge position into non-discharging position.

These and other objects and advantages of the invention will appear more clearly from the following specification in connection with the accompanying drawings, in which:

FIG. 1 illustrates a perspective view of a portion of the understructure or supporting frame of a belt conveyor according to the present invention.

FIG. 2 is a diagrammatic end view of the structure shown in FIG. 1 as seen in the direction of the arrow II.

FIG. 3 shows the structure of FIG. 1 in tilting or discharging position.

FIG. 4 is a diagrammatic end view of the arrangement shown in FIG. 3 as seen in the direction of the arrow IV.

FIG. 5 illustrates in perspective a portion of the understructure of the belt conveyor corresponding to the showing of FIG. 3.

FIG. 6 is an end view of the belt conveyor of the present invention as seen in the direction of the arrow VI of FIG. 7.

FIG. 7 is a perspective illustration of a belt conveyor according to the present invention.

FIGS. 8, 9, 10 and 11 respectively illustrate portions of FIG. 7 on a scale somewhat enlarged over that of FIG. 7.

Figure 12:
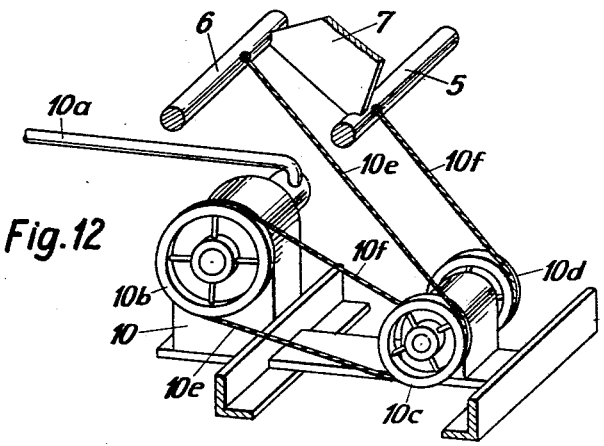

FIG. 12 illustrates a portion of FIG. 5 on a scale larger than that of the latter.

Figure 13:
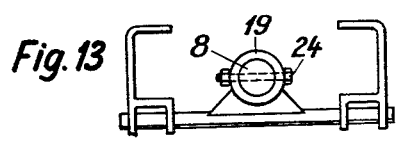

FIG. 13 represents a view somewhat similar to that of FIG. 2 of a modified arrangement according to the invention.

Figure 14:
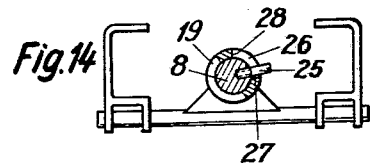

FIG. 14 illustrates similar to FIG. 13 a still further modification of the invention.

A conveyor according to the present invention is characterized primarily in that the guiding rail along its longitudinal extension is at least over one portion of its length composed of individual rail sections adapted to be turned about an axis or a shaft extending in longitudinal direction of the conveyor. If the conveyor is equipped with a plurality of guiding rails, according to a further feature of the invention, the respective oppositely located rail sections of the rails are interconnected at a constant distance and are mounted for rotation about a common axis.

In conformity with the respective requirements, the rails may according to the present invention be composed of rail sections over the entire length of the conveyor. However, if desired, also only certain rail portions may be composed of rail sections while between said rail portions rigid rails are provided. An undesired turning of the rail sections about the shaft may be prevented in a simple manner by locking the rail sections on the shaft therefor or on the frame for the conveyor by means of pins or other locking devices.

If the individual rail sections are short and if each two adjacent rail sections are turned relative to each other only slightly, it is possible already over a short conveyor path to obtain such considerable helical distortion of the moveable parts receiving the material to be conveyed and equipped with rollers, that the material to be conveyed will be laterally discharged. In this connection, the running surfaces on the rails will retain such uniformity that the rollers will be guided over said running surfaces in a completely disturbance-free manner. This uniformity of the running surfaces may be assured by the following features of the invention which also make possible a fast adjustment of the rails. This is of particular importance when the station for lateral discharge of the material to be conveyed has to be changed frequently.

According to a further feature of the invention, the angle may be limited by which the rail sections will be turnable about the axis when changing the discharging station. This feature is for instance employable to great advantage when a conveyor has alternately to discharge laterally at a plurality but precisely determined stations. In this instance, rail portions are employed at the respective discharge station which are in conformity with the present invention composed of rail sections. By stops or abutments on the shaft or the frame of the conveyor, the turning angle of the individual rail sections may be limited to such an extent that the two rail sections at the two ends of the rail portion can turn relative to each other by a very small angle only about the axis while the subsequent rail sections may be turned by a slightly greater angle and, finally, the rail section in the center of the rail portion will have the largest turning angle. In this way, at the discharge station of the conveyor, the rail sections of the rail portion can quickly be turned into discharging position while the predetermined limited turning angles of the individual rail sections will assure the desired, uniformity of the running surfaces for the rollers. Naturally, at the same speed the rail sections may also be returned to their starting position and locked therein.

A further feature of the invention consists in that the turnability or tiltability of each two adjacent rail sections relative to each other is limited. This may be effected for instance in such a way that the rail sections are interconnected so that the play in the connection will permit a tiltability or turning of adjacent rail sections with regard to each other by a certain angle only. If the rail sections of a rail portion are unlocked so that the rail sections can be turned relative to each other, the above mentioned feature will automatically assure a proper running surface for the rollers.

A substantially uniform running surface on the rails may in conformity with the present invention be aided further by designing the rail sections in such a way that at least those portions of the rail sections which form the running surfaces for the rollers will interengage each other in the manner of teeth. In this way a substantially shock-free movement of the rollers from one rail section to the next rail section will be obtained.

The adjustment of the conveyor according to the present invention into discharging position and its adjustment from discharging position into non-discharging position can easily, quickly and absolutely safely be carried out in view of the feature that in one portion of the conveyor, four supporting elements are arranged which extend in longitudinal direction of the conveyor. Of these four supporting elements, two elements are stationarily journalled in the conveyor, whereas the other two supporting elements are by means of an adjusting device tiltable in common about an axis. Furthermore, the rail sections are located in one plane on the first stationary supporting element and on the first tiltable supporting element while being prevented from turning about the axis. Moreover, when tilting the two tiltable supporting elements about the axis into the tilting position, the first tiltable supporting element releases the rail sections on one side of the axis whereas by means of the second tiltable supporting element the rail sections on one side of the axis are lifted off from the first stationary tilting element and are raised while being turned about the axis until the rail sections on one side of the axis have been lowered and rest upon the second stationary supporting element. The second stationary supporting element, which in this position will prevent the rail sections from being turned, and the second tiltable supporting element are so designed that the tilting angle about which the rail sections are turned about the axis will at both ends of the conveyor portion be zero while increasing from the ends and obtaining the maximum value in the central portion of said conveyor portion.

Structural arrangement

Referring now to the drawings in detail, the belt conveyor shown therein has an understructure or main frame 1 with supports 2. The said supports 2 carry a tubular stationary straight supporting element 3 and a stationary bent supporting element 4. The main frame 1 furthermore comprises a tubular turnable or tiltable straight supporting element 5 and a turnable or tiltable bent supporting element 6.

As will be evident from FIG. 5, the two tiltable supporting elements 5 and 6 are connected to eyes 7 and by means of said eyes 7 are tiltable about a shaft 8. Shaft 8 is journalled on supports 9 carried by the main frame 1. The tilting of the supporting elements 5 and 6 is effected by means of an adjusting device 10. For the sake of simplicity, the shaft 8 and the adjusting device 10 have been omitted from FIG. 1 which shows only the four supporting elements 3, 4, 5 and 6.

FIG. 12 shows a portion of FIG. 5 on a larger scale than the latter and, more particularly, shows the adjusting device or tilting mechanism 10. The said adjusting device 10 comprises a manually operable lever 10a adapted to turn the shaft of a pulley 10b having passed thereover a rope 10f which also passes over deviating pulleys 10c and 10d. One rope section 10e is connected to the tiltable supporting element 6, whereas the other rope section 10f is connected to the tiltable supporting element 5. By lifting the manually operable lever 10a, the rope section 10e will pull on the supporting element 6. By pressing the manually operable lever 10a downwardly, the rope section 10f will pull on the supporting element 5, and the two supporting elements 5 and 6 are tilted into the position shown in FIG. 5.

According to FIG. 6, the belt conveyor comprises a conveyor belt 11 which by means of supporting yokes 12 is connected to a carriage 13. Conveyor belt 11 is in a manner known per se so designed that it can be distorted helically in the longitudinal direction of the conveyor. The carriage 13 is equipped with running rollers 14 and guiding rollers 15 which are guided along a definite path by two parallel rails. These rails are in their longitudinal direction composed of rail sections 16, 17 respectively which will be described in detail further below. The rail sections 16 and 17 which are located opposite to each other and pertain to the two rails are interconnected by a bar 18 while being spaced from each other by a constant distance. The rail sections 16 and 17 are by means of an eye 19 connected to bar 18 tiltable about a common shaft 8.

The operation of the device described above is as follows:

*Operation*

When the tiltable supporting elements 5 and 6 occupy the position shown in FIG. 1, the bars 18 interconnecting the rail sections 16 and 17 of the two rails are located horizontally, and the loading surface of the conveyor belt 11 will along the entire length of the illustrated conveyor portion be located in a horizontal plane as will be evident from FIG. 6. The rail sections 16 and 17 will then rest on the tiltable straight supporting element 5 and the stationary straight supporting element 3. For the sake of simplicity, FIG. 1 does not show the conveyor belt illustrated in FIG. 6 with the carriages nor the shaft 8 shown in FIG. 5 for the rail sections and tiltable supporting elements 5, 6. Furthermore, the adjusting device 10 has also been omitted from FIG. 1. Furthermore, for the sake of simplicity, rail sections 16 and 17 are shown only at the start, the central portion and the end of the conveyor portion, while the intermediate rail sections have been omitted.

FIG. 2 diagrammatically shows an end view of the conveyor portion in the position shown in FIG. 1 and also indicates the course of the two straight connecting elements 3 and 5 and of the two bent connecting elements 4 and 6. In this position of the conveyor portion, also the loaded conveyor belt passes by the tilting station without laterally discharging the goods carried by the conveyor belt. The rail sections while being located in one plane are prevented from tilting about shaft 8 by the supporting elements 3 and 4.

If now the adjusting device 10 (FIGS. 5 and 12) is actuated, the two tiltable supporting elements 5 and 6 will e.g. be tilted from their FIG. 1, 2 and 6 position about shaft 8 into their FIG. 3, 4 and 5 position. In connection therewith, the tiltable supporting element 5 releases the rail section 16, and the tiltable supporting element 6 lifts the rail section 17 off the stationary supporting element 3 and tilts the rail sections 16, 17 about shaft 8 until the rail sections 16 rest upon the bent stationary supporting element 4, and the rail sections 17 rest on the bent tiltable supporting element 6 while said rail sections are prevented from being turned.

As will be evident from FIG. 3, the stationary supporting element 4 and the tiltable supporting element 6 are so shaped that the angle of rotation by which the rail sections are turned about shaft 8 will at both ends of the conveyor portion equal zero but from said ends will increase toward the central portion of the conveyor portion and there reach their maximum value. The rail sections shown in FIG. 3 near the ends of the conveyor portion therefore, as will be evident from the drawing have hardly to undergo any turning movement about shaft 8 at all, whereas the rail section located in the central portion will have to carry out the largest turning movement as will be evident from FIG. 4. When the conveyor belt passes through the tilting station, the conveyor belt will be tilted from its horizontal position by means of a uniform helical rotative movement into the vertical position while it will laterally discharge the goods carried thereby and subsequently will be turned back again into its horizontal position.

Thus, by means of the above mentioned shape of the tilting supporting elements 5 and 6, the angle will be limited by which the rail sections 16, 17 will be turned about shaft 8 when the rail sections move from their normal position into their discharging position.

FIG. 7 illustrates in perspective a portion of the conveyor belt while it is being turned from its normal position into its discharge position. A portion of the conveyor belt has been removed in order to show the corresponding turning movement of the rail section.

Figure 8:
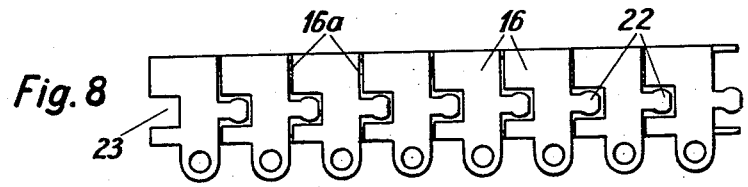

FIGS. 8, 9, 10 and 11 show portions of the rail according to FIG. 7. More specifically, FIG. 8 shows the rail portion in side view with the conveyor moving along a horizontal straight path.

Figure 9:
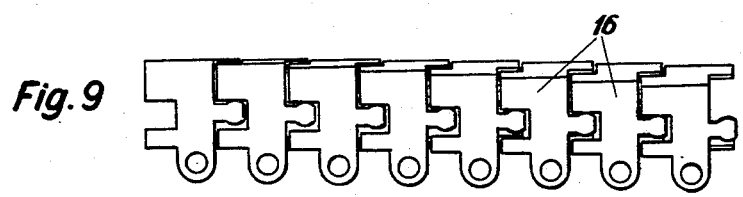

FIG. 9 shows in side view the same rail portion as FIG. 8, however with the rail sections 16 turned relative to each other as is the case in the tilting position of FIG. 7.

Figure 10:
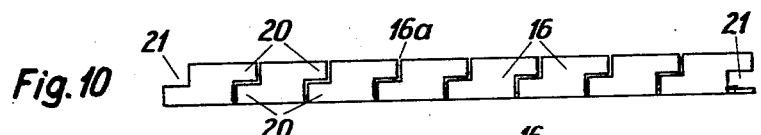

FIG. 10 is a top view of the rail portion according to FIG. 8, i.e. while the belt passes along a horizontal straight path.

Figure 11:

FIG. 11 is a top view of the same rail portion as shown in FIG. 10, however with the rail sections 16 turned relative to each other as is the case in the discharge position of FIG. 7.

FIGS. 8 to 11 clearly show that the individual rail sections are slightly spaced from each other by the distances 16a which permit a relative movement of the rail sections relative to each other.

As will be evident from FIGS. 1, 7, 8, 9, 10 and 11, the rail sections have those portions thereof which form the running surfaces for the running rollers 14 provided with tooth-like portions 20 and recesses 21 by means of which the rail sections engage each other similar to intermeshing teeth. As a result thereof, when the rail sections move into the tilting position shown in FIG. 3, a practically shock-free movement of the rollers 14 from one rail section to the next rail section will be assured so that these rollers can move in a shock-free manner on the running surfaces of the rails. To the same end, also those portions of the rail sections which form the running surfaces for the guiding rollers 15 are provided with teeth 22 and recesses 23. The teeth 22 engage the recesses 23 of the respective adjacent rail section with a play which is so dimensioned that the turnability of two adjacent rail sections relative to each other will be limited to a desired degree. Therefore, the rail sections cannot be moved relative to each other to such an extent that a proper rolling of the rollers 14 on the rails will be endangered.

FIG. 13 shows a modification of the invention inasmuch as the supporting elements 3, 4, 5 and 6 which are intended for tilting a certain portion of the conveyor have been omitted. In all other respects, this embodiment corresponds precisely to the above described embodiment of FIGS. 1 to 12. An undesired turning or tilting movement of the rail sections about shaft 8 will be prevented by the fact that the rail sections are locked on shaft 8 by means of screws 24 which are passed through openings in shaft 8 and eyes 19. In a similar manner it is, of course, also possible to lock the rails by pins or other locking means in the frame of the conveyor. The entire length of the conveyor may, if so desired, be designed in this manner. If it is now intended to tilt the rail sections into discharging position at any point of the conveyor, it is merely necessary in this portion of the conveyor to remove the screws 24 and to turn the rail sections about shaft 8, while two adjacent rail sections can be turned relative to each other only to a certain degree which can be predetermined by correspondingly dimensioning the spacing 16a between the rail sections (FIG. 8). However, the tilting angle of the individual rail sections may also be limited in the way shown in FIG. 14. As will be evident from FIG. 14, pins 25 are screwed into shaft 8 and, when turning the eyes 19, slide on shaft 8 in longitudinal openings 26 of the eyes 19 while the ends 27 and 28 of said longitudinal openings limit the turnability of the eyes 19. It is obvious that in a similar manner also stops or abutments may be provided in the frame of the conveyor for limiting the tilting angle of the individual rail sections.

It is, of course, to be understood that the present invention is, by no means, limited to the particular constructions shown in the drawings but also comprises any modifications within the scope of the appended claims.

What I claim is:

1. In a conveyor: movable means for receiving and carrying goods to be conveyed, said movable means being provided with roller means and being deformable in longitudinal direction of said conveyor along a helical line so as to tilt a portion of said movable means to one side of said conveyor for unloading goods therefrom, supporting means arranged in longitudinal direction of said conveyor for supporting said movable means, said supporting means including rail means, at least one portion of said rail means being composed of a plurality of individual relatively short successively and adjacently arranged rail sections tiltable about an axis extending in longitudinal direction of said conveyor to permit deformation of said rail portion in conformity with the desired helical deformation of said movable means, and means for controlling the tilting angle of said rail sections.

2. In a conveyor: movable means for receiving and carrying goods to be conveyed, said movable means being provided with roller means and being deformable in longitudinal direction of said conveyor along a helical line so as to tilt a portion of said movable means to one side of said conveyor for unloading goods therefrom, supporting means arranged in longitudinal direction of said conveyor for supporting said movable means, said supporting means including a plurality of parallel rails spaced in transverse direction of said conveyor and extending in longitudinal direction of said conveyor for guiding said roller means along a desired path, at least two oppositely located portions of said rails each comprising a plurality of rail sections arranged closely one behind the other in longitudinal direction of said conveyor, the rail sections of one rail being located opposite to the rail sections of another rail, a plurality of connecting members respectively interconnecting two oppositely located rail sections of said rail portions, means tiltably supporting said connecting members to permit tilting movement of said connecting members about an axis extending in longitudinal direction of said conveyor and thereby to permit deformation of said rail portions in conformity with a desired helical deformation of said movable means, and means for controlling the tilting angle of said connecting members and thereby of said rail sections.

3. A conveyor according to claim 1, in which each successive rail section is engaged by the preceding one for limiting the tilting movement of each two successive rail sections relative to each other.

4. In a conveyor: movable means for receiving and carrying goods to be conveyed, said movable means being provided with roller means and being deformable in longitudinal direction of said conveyor along a helical line so as to tilt a portion of said movable means to one side of said conveyor for unloading goods therefrom, supporting means arranged in longitudinal direction of said conveyor for supporting said movable means, said supporting means including rail means for guiding engagement with said roller means, at least a portion of said rail means being composed of a plurality of individual rail sections arranged one behind the other in longitudinal direction of said conveyor and tiltable about an axis extending in longitudinal direction of said conveyor to permit deformation of said rail portion in conformity with a desired helical deformation of said movable means, and means for controlling the tilting angle of said rail sections, each two successive rail sections having those surfaces thereof which are provided for guiding engagement with said roller means respectively provided with a tongue and a recess for receiving said tongue.

5. In a conveyor having a plurality of serially arranged interconnected frame sections: movable means for receiving and carrying goods to be conveyed, said movable means being provided with roller means and being deformable in longitudinal direction of said conveyor along a helical line so as to tilt a portion of said movable means to one side of said conveyor for unloading goods therefrom, said frame sections comprising supporting means arranged in longitudinal direction of said conveyor for supporting said movable means and including rail means for guiding said roller means, at least one of said frame sections comprising a first pair of supporting members arranged stationarily and extending in longitudinal direction of said conveyor and also comprising a second pair of supporting members connected to each other and extending in longitudinal direction of said conveyor, means supported by that frame section which comprises said second pair of supporting members for tiltably supporting said second pair of supporting members for selective tilting movement about an axis extending in longitudinal direction of said conveyor from a first position into a second position and vice versa, said first and second pairs of supporting members being so contoured and cooperating with each other so as in response to said second pair of supporting members occupying said first position to hold said rail sections in position for moving said movable means in upright position and in response to said second pair of supporting members occupying said second position to gradually guide said movable means into a tilting position for unloading goods from said movable means, those rail means which are adjacent said second pair of supporting members being composed of a plurality of individual relatively short successively and adjacently arranged rail sections tiltable about an axis extending in longitudinal direction of said conveyor to permit deformation of said one frame section in conformity with a desired helical deformation of said movable means, and means for controlling the tilting angle of said rail sections.

References Cited in the file of this patent

UNITED STATES PATENTS

| | | |
|---|---|---|
| 616,688 | Richards | Dec. 27, 1898 |
| 2,795,315 | Hahir et al. | June 11, 1957 |

FOREIGN PATENTS

| | | |
|---|---|---|
| 116,424 | Austria | Feb. 25, 1930 |